United States Patent
Sasaki

(10) Patent No.: US 8,380,380 B2
(45) Date of Patent: *Feb. 19, 2013

(54) ELECTRIC POWER RECEPTION APPARATUS AND ELECTRICAL POWERED VEHICLE

(75) Inventor: Masaru Sasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,691

(22) Filed: May 17, 2011

(65) Prior Publication Data

US 2011/0276208 A1  Nov. 10, 2011

Related U.S. Application Data

(63) Continuation-in-part of application No. PCT/JP2008/071215, filed on Nov. 21, 2008.

(51) Int. Cl.
*B60L 15/12* (2006.01)

(52) U.S. Cl. ......... 701/22; 307/10.1

(58) Field of Classification Search ............. 701/22; 320/104, 106–109, 139, 135, 164; 180/65.1, 180/68.1; 307/10.1, 104; 191/22 R, 10, 191/4; 336/83

See application file for complete search history.

(56) References Cited

U.S. PATENT DOCUMENTS

| | | | |
|---|---|---|---|
| 5,926,004 A | 7/1999 | Henze | |
| 6,100,663 A * | 8/2000 | Boys et al. | 320/108 |
| 6,421,600 B1 * | 7/2002 | Ross | 701/117 |
| 6,525,510 B1 | 2/2003 | Ayano et al. | |
| 7,416,039 B1 | 8/2008 | Anderson et al. | |
| 7,741,734 B2 | 6/2010 | Joannopoulos et al. | |
| 7,825,543 B2 * | 11/2010 | Karalis et al. | 307/104 |
| 2005/0068019 A1 | 3/2005 | Nakamura et al. | |
| 2007/0222542 A1 | 9/2007 | Joannopoulos et al. | |
| 2007/0247005 A1 | 10/2007 | Tetlow | |
| 2008/0278264 A1 | 11/2008 | Karalis et al. | |
| 2009/0195332 A1 | 8/2009 | Joannopoulos et al. | |

(Continued)

FOREIGN PATENT DOCUMENTS

| | | |
|---|---|---|
| AU | 2006269374 B2 | 1/2007 |
| AU | 2006269374 CI | 1/2007 |

(Continued)

OTHER PUBLICATIONS

Oct. 18, 2011 Office Action issued in Japanese Patent Application No. 2010-539094 (with translation).

(Continued)

*Primary Examiner* — Dalena Tran
(74) *Attorney, Agent, or Firm* — Oliff & Berridge, PLC

(57) ABSTRACT

A secondary self-resonant coil is installed at substantially the central region of the bottom face of the vehicle body, receiving electric power from a power feeding apparatus in a non-contact manner by resonating with a primary self-resonant coil of a power feeding apparatus provided external to the vehicle, via an electromagnetic field. In a power reception mode from the power feeding apparatus, high voltage is generated at the wire end of the secondary self-resonant coil, causing generation of a high electric field around the wire end. In order to keep the wire end distant from an ECU that is an electric apparatus located closest to the secondary self-resonant coil, the secondary self-resonant coil is arranged such that the wire end is located at a side opposite to the side where the ECU is deviated relative to the bilateral symmetric axis of the vehicle body.

8 Claims, 11 Drawing Sheets

U.S. PATENT DOCUMENTS

| | | |
|---|---|---|
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1 | 9/2010 | Oyobe et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0295505 A1 | 11/2010 | Jung et al. |
| 2010/0295506 A1 | 11/2010 | Ichikawa |
| 2011/0276208 A1 | 11/2011 | Sasaki |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-5-111168 | 4/1993 |
| JP | A-8-237890 | 9/1996 |
| JP | A-2005-73313 | 3/2005 |
| JP | A-2005-149238 | 6/2005 |
| JP | A-2009-501510 | 1/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

OTHER PUBLICATIONS

Andre Kurs et al., "Wireless Power Transfer via Strongly Coupled Magnetic Resonances", [online], Jul. 6, 2007, Science, vol. 317, p. 83-86, [Searched on Sep. 12, 2007], Internet<URL; http://www.sciencemag.org/cgi/reprint/317/5834/83.pdf>.

International Search Report issued in Application No. PCT/JP2008/071215 on Feb. 17, 2009.(with translation).

Mar. 2, 2012 Office Action issued in U.S. Appl. No. 13/129,742.

Jun. 25, 2012 Notice of Allowance issued in U.S. Appl. No. 13/129,742.

* cited by examiner

ELECTRIC POWER RECEPTION APPARATUS AND ELECTRICAL POWERED VEHICLE

This is a Continuation-in-Part of PCT Application No. PCT/JP2008/071215 filed Nov. 21, 2008. The entire contents of which are hereby incorporated by reference.

BACKGROUND OF THE INVENTION

1. Field of the Invention

The present invention relates to electric power reception apparatuses and electrical powered vehicles, particularly an electric power reception apparatus and electrical powered vehicle that can receive electric power in a non-contact manner from a power feeding apparatus by causing resonance between resonant coils, each incorporated in a vehicle and a power feeding apparatus external to the vehicle, through an electromagnetic field.

2. Description of the Background Art

Great attention is focused on electrical powered vehicles such as an electric vehicle and hybrid vehicle as environment-friendly vehicles. An electric vehicle has a vehicle-mounted battery charged from a power source external to the vehicle, and the motor is driven using the charged electric power for running. A hybrid vehicle refers to a vehicle incorporating an engine as a power source, in addition to a motor, or a vehicle further incorporating a fuel cell as the direct current power source for driving the vehicle.

Among the hybrid vehicles there is known a vehicle that allows charging of the vehicle-mounted battery from a power source external to the vehicle, likewise with an electric vehicle. For example, the so-called "plug-in hybrid vehicle" is known that allows the battery to be charged from a general household power supply by establishing connection between the plug socket located at an establishment and the charging inlet provided at the vehicle through a charging cable.

As a method for power transfer, attention is recently focused on wireless electrical power transmission without using power supply cords and/or cables for electrical transmission. Three promising approaches of this wireless power transfer technique are known, i.e. power transfer using electromagnetic induction, power transfer using micro waves, and power transfer through the resonance method.

The resonance method thereof is a non-contact power transfer approach transferring power via an electromagnetic field by causing resonance at a pair of self-resonant coils (near field) via the electromagnetic field, allowing electric power as high as several kW to be transferred over a relatively long distance (for example, several meters).

SUMMARY OF THE INVENTION

In the case where the aforementioned non-contact power transfer technique through resonance is used for power feeding towards an electrical powered vehicle from a power source external to the vehicle, there must be provided a secondary self-resonant coil installed at the vehicle to receive power from a power feeding apparatus external to the vehicle by resonating with the primary self-resonant coil via an electromagnetic field. In a power reception mode from the power feeding apparatus, a voltage that varies according to the resonant frequency (for example, MHz level) is generated at the wire of the secondary self-resonant coil. The voltage becomes greater as a function of approaching the end of the wire, and is highest at the end of the wire. For example, when the electric power transmitted from the primary self-resonant coil to the secondary self-resonant coil attains the level of kW, a voltage as high as to cause corona discharge around the wire end (for example, kV level) is generated at the wire end of the secondary self-resonant coil.

A high electric field is generated in the proximity of the wire end by the high voltage occurring at the wire end of the secondary self-resonant coil. This high electric field may adversely affect the operation of the each electric apparatus (for example, battery, converter, inverter, motor, electronic control unit, various sensors, and the like) installed at the electrical powered vehicle.

A possible approach to suppress the spread of the high electric field generated around the wire end is to provide an electromagnetic shield to at least the wire end of the secondary self-resonant coil. However, this approach requires the space for installing the shield mechanism, and will cause increase in the cost and weight of the vehicle.

The electric field generated around the wire end of the secondary self-resonant coil may also be suppressed by reducing the power supply rate from the power feeding apparatus external to the vehicle to the electrical powered vehicle. However, this approach will cause increase in the power feeding time, which is a problem in practical usage in an electrical powered vehicle that requires power feeding speedily in the kWh level, for example.

The present invention is directed to solving such a problem, and an object of the present invention is to suppress the adverse effect of the high electric field generated when power is received on a vehicle-mounted electric apparatus at low cost and without reducing the feeding electric power, in an electrical powered vehicle capable of receiving electric power from a power feeding apparatus external to the vehicle through a resonance method.

According to the present invention, an electrical powered vehicle capable of generating a vehicle driving force by electric power includes a secondary self-resonant coil, and an electric apparatus. The secondary self-resonant coil is installed at a predetermined position, and resonates, via an electromagnetic field, with a primary self-resonant coil provided at a power feeding apparatus external to the vehicle to receive power in a non-contact manner from the primary self-resonant coil. The electric apparatus includes at least one of a power storage device capable of storing electric power received by the secondary self-resonant coil, an electric motor generating a vehicle driving force, a driving device driving the electric motor using the electric power received by the secondary self-resonant coil, and an electronic control unit controlling the driving device. The secondary self-resonant coil is arranged such that the distance between the wire end of the secondary self-resonant coil and the electric apparatus is most ensured.

Preferably, the secondary self-resonant coil is an LC resonant coil having ends open.

Preferably, the secondary self-resonant coil is arranged such that the wire end is kept distant from the electric apparatus located closest to the secondary self-resonant coil.

Preferably, the electric motor and driving device are arranged at the front region of the vehicle. The power storage device is arranged at the rear region of the vehicle. The electronic control apparatus is arranged between the electric motor as well as the driving device and the power storage device in the longitudinal direction of the vehicle, and is located deviated to the left side or right side from the bilateral symmetric axis of the vehicle. The secondary self-resonant coil is installed at substantially the central region at the bottom of the vehicle, and arranged such that the wire end is located at the side opposite to the side where the electronic control apparatus is deviated relative to the bilateral symmetric axis.

Preferably, the electric motor and driving device are arranged at the front region of the vehicle. The power storage device is arranged at the rear region of the vehicle. The electronic control apparatus is arranged between the electric motor as well as the driving device and the power storage device in the longitudinal direction of the vehicle, and located deviated to the left or right side from the bilateral symmetric axis of the vehicle. The secondary self-resonant coil is installed at substantially the central region at an upper portion of the vehicle, and arranged such that the wire end is located at the side opposite to the side where the electronic control apparatus is deviated relative to the bilateral symmetric axis.

More preferably, the electric motor and driving device are arranged at the front region of the vehicle. The power storage device is arranged in close proximity to the bottom of the vehicle at the rear region of the vehicle. The electronic control apparatus is arranged between the electric motor as well as the driving device and the power storage device in the longitudinal direction of the vehicle. The secondary self-resonant coil is installed at the rearmost region of the vehicle, and arranged such that the wire end is located at an upper portion side of the vehicle.

In the present invention, the secondary self-resonant coil is installed at a predetermined position, and receives power in a non-contact manner from a primary self-resonant coil provided at a power feeding apparatus external to the vehicle by resonating, via an electromagnetic field, with the primary self-resonant coil. At this stage, high voltage occurs at the wire end of the secondary self-resonant coil, causing generation of a high electric field around the wire end. Since the secondary self-resonant coil is arranged such that the distance between the wire end of the secondary self-resonant coil and the electric apparatus is most ensured, the effect of the high electric field generated around the wire on a vehicle-mounted electric apparatus is suppressed.

According to the present invention, the adverse effect of the high electric field generated at the time of receiving electric power from the power feeding apparatus external to the vehicle on a vehicle-mounted electric apparatus can be suppressed at low cost. Further, according to the present invention, the adverse effect of the high electric field generated at the time of power reception on the vehicle-mounted electric apparatus can be suppressed without reducing the feeding electric power.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
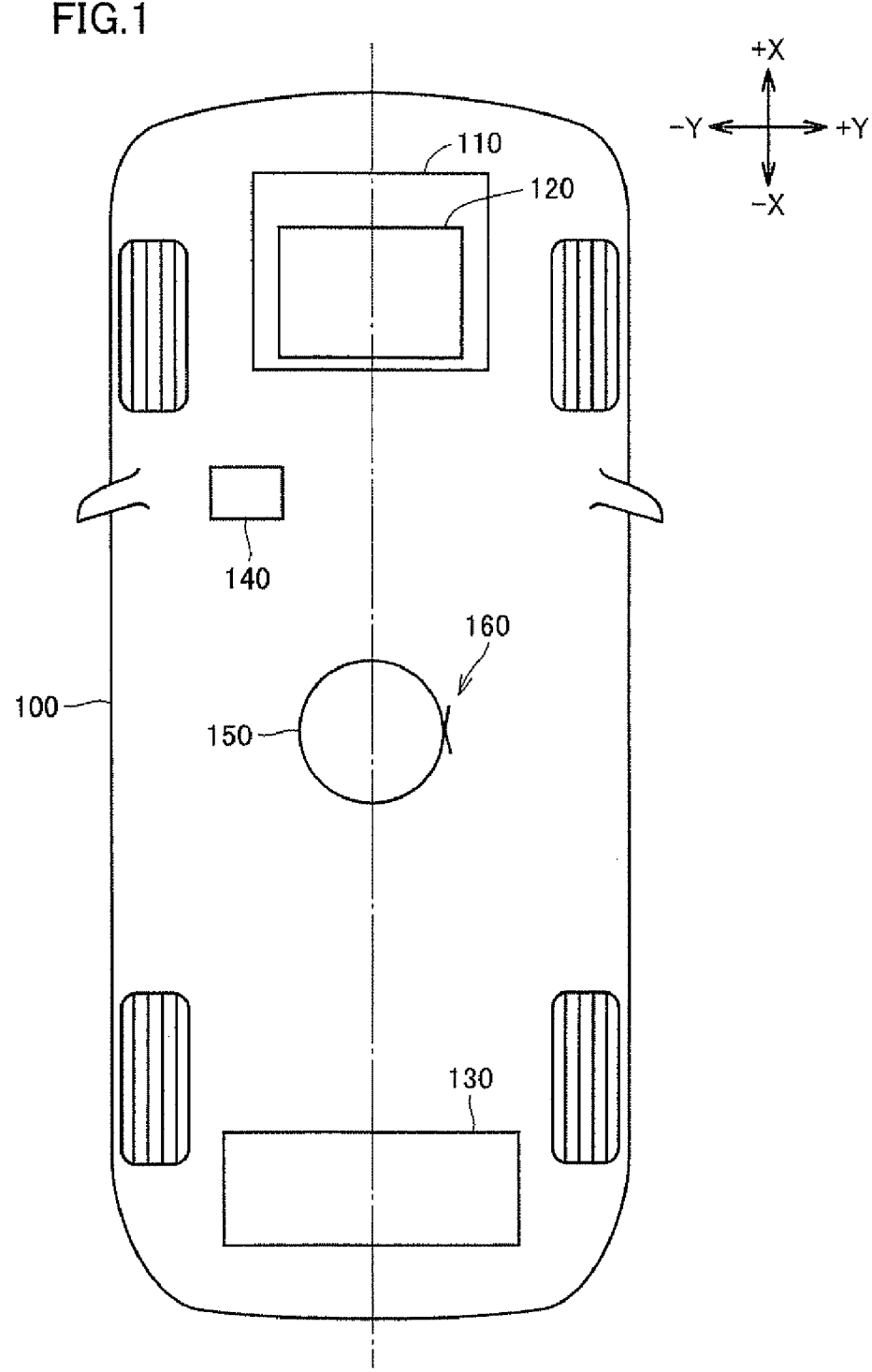
FIG. 1 represents an arrangement of the main part of an electrical powered vehicle according to a first embodiment of the present invention, viewed from above the vehicle.

Embodiments of the present invention will be described hereinafter in detail with reference to the drawings. In the drawings, the same or corresponding elements have the same reference characters allotted, and description thereof will not be repeated.

First Embodiment

Figure 2:
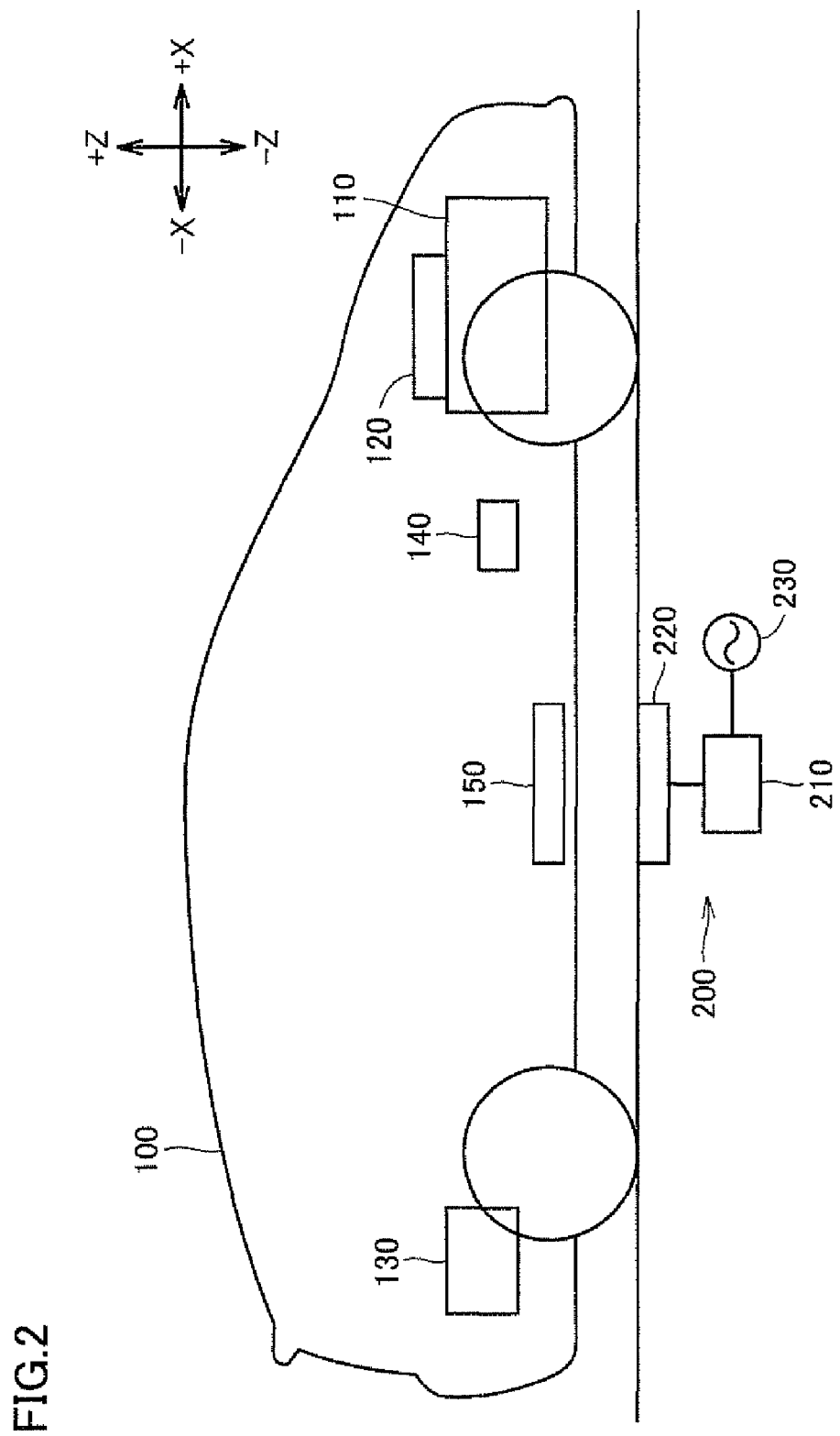
FIG. 2 represents an arrangement of the main part of the electrical powered vehicle of FIG. 1, viewed from a side of the vehicle.

FIG. 1 represents an arrangement of the main part of an electrical powered vehicle according to a first embodiment of the present invention, viewed from above the vehicle. FIG. 2 represents the arrangement of the main part of the electrical powered vehicle of FIG. 1, viewed from a side of the vehicle.

Referring to FIGS. 1 and 2, an electrical powered vehicle 100 includes a transaxle 110, a power control unit (hereinafter, also referred to as "PCU") 120, a power storage device 130, an electronic control unit (hereinafter, also referred to as "ECU") 140, and a secondary self-resonant coil 150.

Transaxle 110 includes a motor generating a vehicle driving force, a generator generating electric power using the driving power of an engine not shown, a power transmission gear, a differential gear, and the like. In electrical powered vehicle 100, transaxle 110 is arranged at the front region of the vehicle body (+X direction indicated in FIG. 1). Various sensors (not shown) such as a temperature sensor, current sensor and rotation sensor for the aforementioned motor and generator are provided at transaxle 110.

PCU 120 includes an inverter for driving the aforementioned motor and generator, a boost converter boosting the output voltage from power storage device 130 for output to the inverter, and the like. At this electrical powered vehicle 100, PCU 120 is arranged at the front region of the vehicle body, for example, above transaxle 110. Various sensors (not shown) such as a temperature sensor, current sensor and voltage sensor are provided for PCU 120.

Power storage device 130 is a DC power source capable of recharging, such as a lithium ion or nickel-metal hydride secondary battery. At electrical powered vehicle 100, power storage device 130 is arranged at the rear region of the vehicle body (−X direction indicated in FIG. 1). Power storage device 130 stores the electric power transferred from a power feeding apparatus 200 (FIG. 2) external to the vehicle and received by secondary self-resonant coil 150, as well as the regeneration electric power generated by transaxle 110 and output from PCU 120. Power storage device 130 supplies the stored electric power to PCU 120. For power storage device 130, a capacitor of large capacitance may be employed. It is to be noted that any electric power buffer that can temporarily store the electric power supplied from power feeding apparatus 200 or the regeneration electric power from PCU 120 and provide the supplied electric power to PCU 120 may be employed. Various sensors (not shown) such as a voltage sensor, current sensor, and temperature sensor are provided for power storage device 130.

ECU 140 generates and provides to PCU 120 a signal to drive the motor and generator included in transaxle 110 to control PCU 120. At this electrical powered vehicle 100, ECU 140 is arranged between transaxle 110 as well as PCU 120 and power storage device 130 in the longitudinal direction of the vehicle body, and located deviated to the left side from the bilateral symmetric axis (−Y direction indicated in FIG. 1) of the vehicle body. For example, ECU 140 is arranged at the front side of the front passenger seat located in the −Y direction relative to the bilateral symmetric axis of the vehicle body.

Secondary self-resonant coil 150 receives electric power from power feeding apparatus 200 external to the vehicle by resonating, via an electromagnetic field, with primary self-resonant coil 220 (FIG. 2) provided at power feeding apparatus 200. At this electrical powered vehicle 100, secondary self-resonant coil 150 is installed at substantially the central region at the bottom of the vehicle body. Secondary self-resonant coil 150 is an LC resonant coil with both ends open (non-connected), and arranged such that wire end 160 of the coil is located at the side (+Y direction indicated in FIG. 1) opposite to the side (−Y direction) where ECU 140 is deviated relative to the bilateral symmetric axis of the vehicle body (FIG. 1).

Secondary self-resonant coil 150 has its number of windings set appropriately such that the Q value representing the resonance strength between primary self-resonant coil 220 and secondary self-resonant coil 150 (for example, Q>100), the κ value representing the degree of coupling thereof and the like become higher, based on the distance from primary self-resonant coil 220 of power feeding apparatus 200, the resonant frequency of primary self-resonant coil 220 and secondary self-resonant coil 150, and the like.

Power feeding apparatus 200 (FIG. 2) provided external to the vehicle includes a high frequency power driver 210, and a primary self-resonant coil 220. High frequency power driver 210 converts the commercial AC electric power supplied from system power source 230 into an electric power of high frequency, which is supplied to primary self-resonant coil 220. Primary self-resonant coil 220 resonates with secondary self-resonant coil 150 of the vehicle side via an electromagnetic field, whereby the electric power supplied from high frequency power driver 210 is transmitted to secondary self-resonant coil 150 of the vehicle side in a non-contact manner. The frequency of the high frequency electric power generated by high frequency power driver 210 is, for example, 1M to ten and several MHz.

Figure 3:
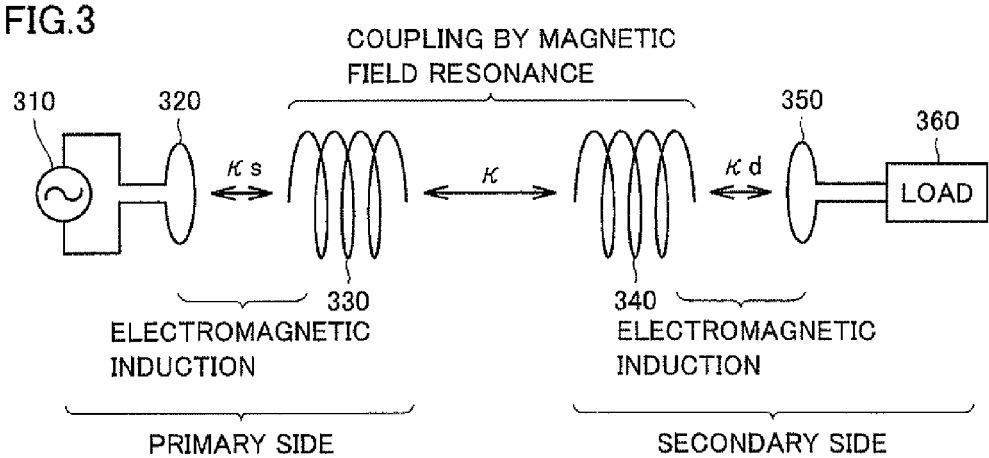
FIG. 3 is a diagram to describe the mechanism of power transfer by a resonance method.

FIG. 3 is a diagram to describe the mechanism of power transmission by the resonance method. Referring to FIG. 3, the resonance method is similar to the resonance of two tuning forks. By the resonance of two LC resonant coils having the same natural frequency at the electromagnetic field (near field), electric power is transferred from one resonant coil to the other resonant coil via the electromagnetic field.

Specifically, primary coil 320 is connected to high frequency power source 310, and electric power of a frequency as high as 1M to ten and several MHz is supplied to primary self-resonant coil 330 that is magnetically coupled with primary coil 320 by electromagnetic induction, Primary self-resonant coil 330 is an LC resonator based on the coil's inductance and floating capacitance, resonating with secondary self-resonant coil 340 having the same resonant frequency as primary self-resonant coil 330 via an electromagnetic field (near field). Accordingly, energy (electric power) is transferred from primary self-resonant coil 330 to secondary self-resonant coil 340 via the electromagnetic field. The energy (electric power) transferred to secondary self-resonant coil 340 is extracted by secondary coil 350 magnetically coupled with secondary self-resonant coil 340 through electromagnetic induction to be provided to a load 360. Power transmission by the resonance method is realized when the Q value representing the resonance strength between primary self-resonant coil 330 and secondary self-resonant coil 340 is higher than 100, for example.

Figure 4:
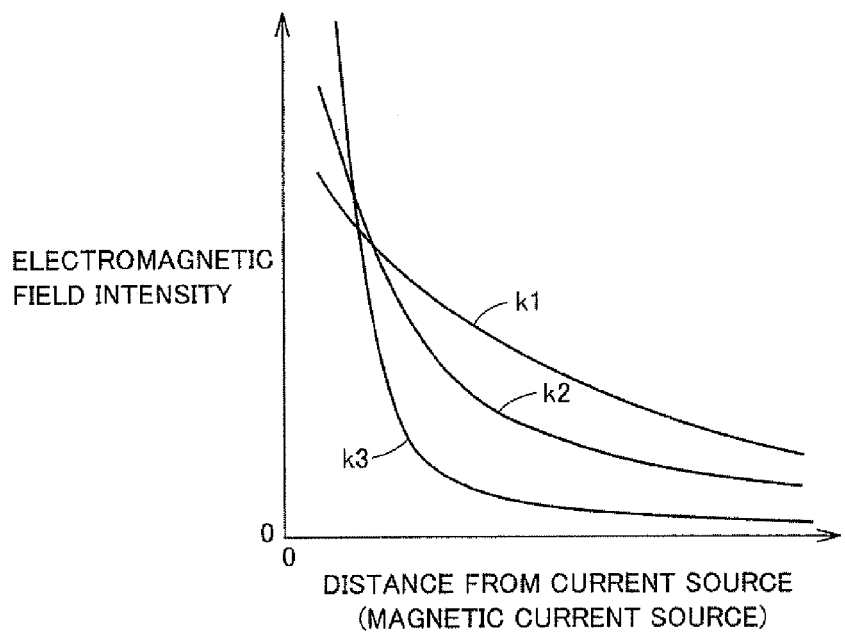
FIG. 4 represents the relationship between the distance from a current source (magnetic current source) and the electromagnetic field.

FIG. 4 represents the relationship between the distance from a current source (magnetic current source) and the electromagnetic field intensity. Referring to FIG. 4, the electromagnetic field is composed of three components. Curve k1 represents a component inversely proportional to the distance from the wave source, and is referred to as "radiation electromagnetic field". Curve k2 represents a component inversely proportional to the square of the distance from the wave source, and is referred to as "induction electromagnetic field". Curve k3 represents a component inversely proportional to the cube of the distance from the wave source, and is referred to as "static electromagnetic field".

There is a region where the intensity of the electromagnetic wave decreases drastically according to the distance from the wave source. In the resonance method, energy (electric power) is transmitted taking advantage of the near field (evanescent field). Specifically, taking advantage of the near field, a pair of LC resonant coils having the same natural frequency is caused to resonate, whereby energy (electric power) is transferred from one LC resonant coil (primary self-resonant coil) to the other LC resonant coil (secondary self-resonant coil). Since this near field does not pass on energy (electric power) far away, the resonance method allows power transmission with lower energy loss as compared to an electromagnetic wave that transmits energy (electric power) by the "radiation electromagnetic field" that passes on energy over a great distance.

Figure 5:
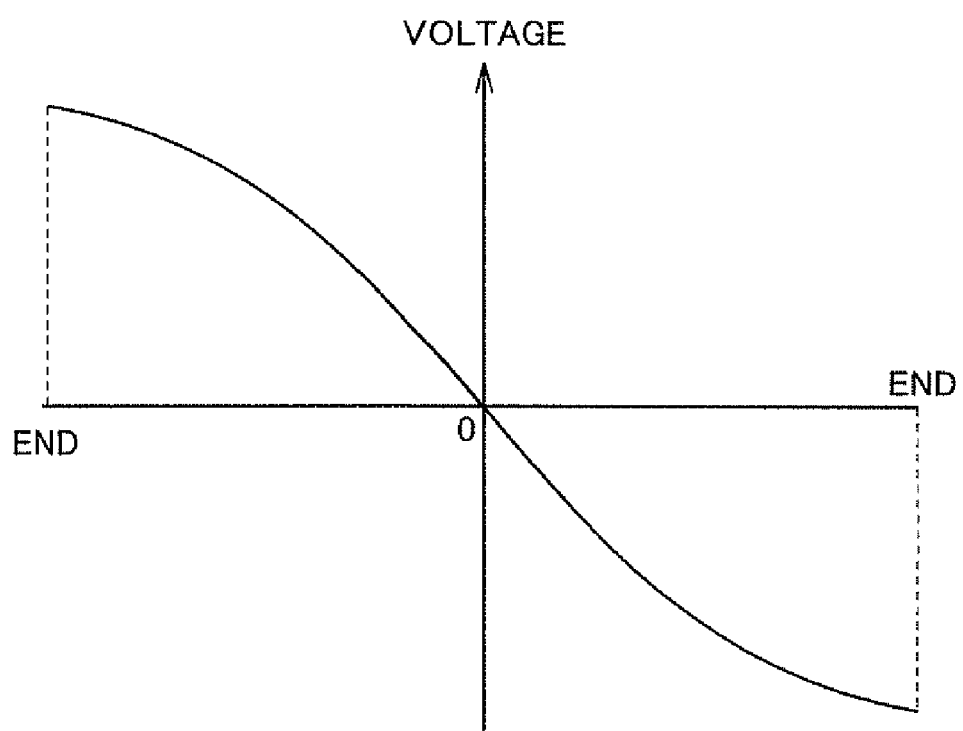
FIG. 5 represents the voltage distribution of the secondary self-resonant coil shown in FIGS. 1 and 2.

FIG. 5 represents the voltage distribution of secondary self-resonant coil 150 shown in FIGS. 1 and 2. Referring to FIG. 5, the horizontal axis represents the distance from the center of the wire constituting secondary self-resonant coil 150, whereas the vertical axis represents the voltage generated at the wire in a power reception mode of secondary self-resonant coil 150. As shown in FIG. 5, the voltage becomes higher as a function of approaching the wire end, and becomes highest at the end. For example, when the received electric power by secondary self-resonant coil 150 attains the level of kW, a voltage so high (for example, kV level) that causes corona discharge at the wire end will be generated. The voltage at the central region of the wire is zero, and the sign of the voltage is inverted according to the resonant frequency.

In power feeding through the resonance method, high voltage is generated at the wire end of the self-resonant coil.

When the resonance method is employed in feeding power to an electrical powered vehicle requiring the supply of electric power as great as the kW level, a high electric field is developed that may adversely affect the operation of the vehicle-mounted electric apparatus, around the wire end of the secondary self-resonant coil installed at the vehicle. In the first embodiment, secondary self-resonant coil 150 is arranged so as to ensure sufficient distance between wire end 160 of secondary self-resonant coil 150 installed at substantially the central region at the bottom of the vehicle body and each electric apparatus (transaxle 110, PCU 120, power storage device 130, and ECU 140).

Specifically, although ECU 140 is in close proximity to secondary self-resonant coil 150 in the first embodiment, secondary self-resonant coil 150 is arranged such that wire end 160 of the coil is located at a side (+Y direction indicated in FIG. 1) opposite to the side (−Y direction) where ECU 140 is deviated relative to the bilateral symmetric axis of the vehicle body for the purpose of keeping wire end 160 of secondary self-resonant coil 150 distant from ECU 140.

Figure 6:
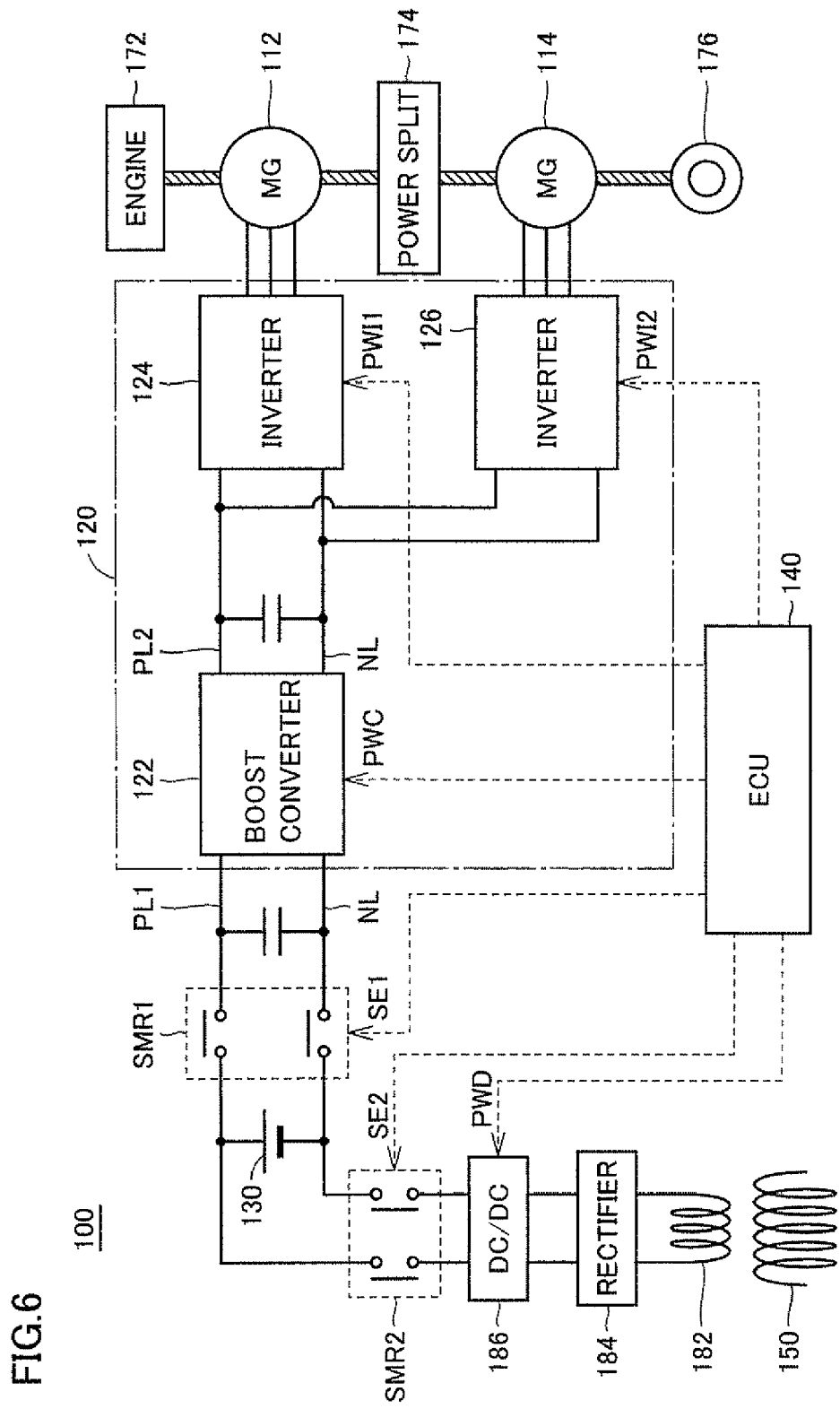
FIG. 6 is a block diagram representing a configuration of a powertrain of the electrical powered vehicle of FIGS. 1 and 2.

FIG. 6 is a block diagram representing a powertrain configuration of electrical powered vehicle 100 of FIGS. 1 and 2. Referring to FIG. 6, electrical powered vehicle 100 includes a power storage device 130, a system main relay SMR1, a boost converter 122, inverters 124, 126, motor generators 112, 114, an engine 172, a power split device 174, and a driving wheel 176. Additionally, electrical powered vehicle 100 further includes secondary self-resonant coil 150, secondary coil 182, rectifier 184, DC/DC converter 186, system main relay SMR2, and ECU 140.

Electrical powered vehicle 100 incorporates engine 172 and motor generator 114 as the driving source. Engine 172 and motor generators 112 and 114 are coupled with power split device 174. Electrical powered vehicle 100 runs by the driving power generated by at least one of engine 172 and motor generator 114. The power generated by engine 172 is divided into two paths by power split device 174. Specifically, one path is directed to driving wheel 176, and the other path is directed to motor generator 112.

Motor generator 112 is an AC rotating electric machine formed of for example, a 3-phase AC synchronous electric motor having a permanent magnet embedded in a rotor. Motor generator 112 generates electric power using the kinetic energy of engine 172 via power split device 174. For example, when the SOC (state of charge) of power storage device 130 becomes lower than a predetermined value, engine 172 is started and electric power is generated by motor generator 112, whereby power storage device 130 is charged.

Motor generator 114 is also an AC rotating electric machine formed of, for example, a 3-phase AC synchronous electric motor having a permanent magnet embedded in a rotor, likewise with motor generator 112. Motor generator 114 generates driving power using at least one of the electric power stored at power storage device 130 and the electric power generated by motor generator 112. The driving power of motor generator 114 is transmitted to driving wheel 176.

In a braking mode of the vehicle or in an acceleration reducing mode at a downward slope, the mechanical energy stored at the vehicle as a kinetic energy or potential energy is used for the rotational drive of motor generator 114 through driving wheel 176, whereby motor generator 114 operates as a power generator. Accordingly, motor generator 114 operates as a regenerative brake converting the running energy into electric power to generate the braking force. The electric power generated by motor generator 114 is stored in power storage device 130.

Power split device 174 is formed of a planetary gear set including a sun gear, a pinion gear, a carrier, and a ring gear. The pinion gear engages with the sun gear and ring gear. The carrier supports the pinion gear to allow rotation on its axis, and is coupled to the crankshaft of engine 172. The sun gear is coupled to the rotational shaft of motor generator 112. The ring gear is coupled to the rotational shaft of motor generator 114 and to driving wheel 176.

Motor generators 112 as well as 114 and power split device 174 constitute transaxle 110 shown in FIGS. 1 and 2. Engine 172 is not illustrated in FIGS. 1 and 2. System main relay SMR1 is disposed between power storage device 130 and boost converter 122. System main relay SMR1 electrically connects power storage device 130 with boost converter 122 when a signal SE1 from ECU 140 is rendered active, and disconnects the electrical path between power storage device 130 and boost converter 122 when signal SE1 is rendered inactive. Boost converter 122 responds to a signal PWC from ECU 140 to boost the voltage on positive line PL2 to a level greater than the output voltage from power storage device 130. For example, a DC chopper circuit constitutes this boost converter 122. Inverters 124 and 126 are provided corresponding to motor generators 112 and 114, respectively. Inverter 124 drives motor generator 112 based on a signal PWI1 from ECU 140. Inverter 126 drives motor generator 114 based on a signal PWI2 from ECU 140. A 3-phase bridge circuit, for example, constitutes each of inverters 124 and 126.

Boost converter 122 and inverters 124 and 126 constitute PCU 120 of FIGS. 1 and 2.

Secondary coil 182 is arranged coaxial with secondary self-resonant coil 150, and can be coupled magnetically with secondary self-resonant coil 150 by electromagnetic induction. This secondary coil 182 extracts the electric power received by secondary self-resonant coil 150 through electromagnetic induction for output to rectifier 184.

Rectifier 184 rectifies the AC power extracted by secondary coil 182. DC/DC converter 186 responds to a signal PWD from ECU 140 to convert the electric power rectified by rectifier 184 to the voltage level of power storage device 130 for output thereto. System main relay SMR2 is arranged between DC/DC converter 186 and power storage device 130. System main relay SMR2 electrically connects power storage device 130 with DC/DC converter 186 when a signal SE2 from ECU 140 is rendered active, and disconnects the electrical path between power storage device 130 and DC/DC converter 186 when signal SE2 is rendered inactive.

ECU 140 generates signals PWC, PWI1 and PWI2 to drive boost converter 122, motor generator 112, and motor generator 114, respectively, based on the accelerator pedal position, vehicle speed, and signals from various sensors. The generated signals PWC, PWI1 and PWI2 are output to boost converter 122, inverter 124, and inverter 126, respectively. In a vehicle running mode, ECU 140 renders signal SE1 active to turn on system main relay SMR1, and renders signal SE2 inactive to turn off system main relay SMR2.

When power feeding from power feeding apparatus 200 (FIG. 2) to electrical powered vehicle 100 is carried out, ECU 140 renders signal SE2 active to turn on system main relay SMR2. Then, ECU 140 generates signal PWD directed to driving DC/DC converter 186, and provides the generated signal PWD thereto.

DC/DC converter 186 is not mandatory, and the AC power extracted by secondary coil 182 may be rectified by rectifier 184 and then directly applied to power storage device 130.

According to the first embodiment, secondary self-resonant coil 150 is installed at substantially the central region at the bottom of the vehicle body. Although high voltage is generated at wire end 160 of secondary self-resonant coil 150 in a power reception mode from power feeding apparatus 200 to cause a high electric field around wire end 160, secondary self-resonant coil 150 is arranged such that wire end 160 is located at a side (+Y direction indicated in FIG. 1) opposite to the side (−Y direction) where ECU 140 is deviated relative to the bilateral symmetric axis of the vehicle body, in order to keep wire end 160 distant from ECU 140 that is the electric apparatus located closest to secondary self-resonant coil 150. Thus, the effect of the high electric field generated around wire end 160 on ECU 140 is suppressed. According to the first embodiment, the adverse effect of the high electric field generated at the time of power reception on the vehicle-mounted electric apparatus (ECU 140) can be suppressed at low cost. Furthermore, according to the first embodiment, the adverse effect of the high electric, field generated at the time of power reception on the vehicle-mounted electric apparatus (ECU 140) can be suppressed without reducing the feeding electric power.

Second Embodiment

Figure 7:
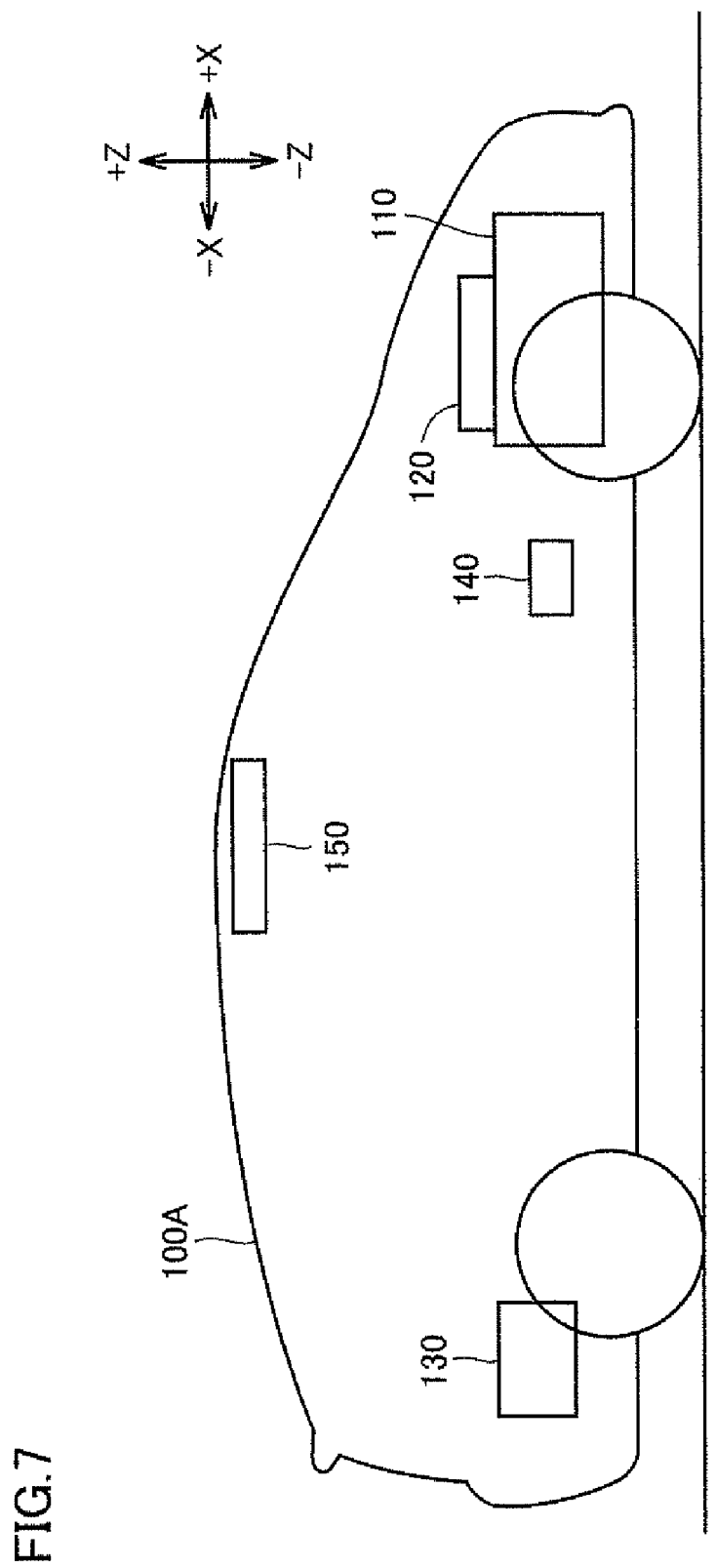
FIG. 7 represents an arrangement of the main part of an electrical powered vehicle according to a second embodiment, viewed from a side of the vehicle.

FIG. 7 represents an arrangement of the main part of an electrical powered vehicle according to a second embodiment, viewed from a side of the vehicle. The arrangement of the main part of this electrical powered vehicle viewed from above is similar to that of FIG. 1. Referring to FIG. 7 as well as to FIG. 1, an electrical powered vehicle 100A has secondary self-resonant coil 150 installed at substantially the central region at the upper portion of the vehicle body. Secondary self-resonant coil 150 is arranged such that wire end 160 of the coil is located at a side (+Y direction indicated in FIG. 1) opposite to the side (−Y direction indicated in FIG. 1) where ECU 140 is deviated relative to the bilateral symmetric axis of the vehicle (FIG. 1).

The arrangement of the remaining electric apparatuses, i.e. transaxle 110, PCU 120, power storage device 130 and ECU 140, is identical to that of electrical powered vehicle 100 of the first embodiment. Furthermore, although not particularly illustrated, power feeding apparatus 200 of the second embodiment is provided at the upper side portion (+Z direction) of the vehicle.

In order to keep wire end 160 distant from ECU 140 that is located closest to secondary self-resonant coil 150, secondary self-resonant coil 150 is arranged such that wire end 160 is located in the +Y direction relative to the bilateral symmetric axis of the vehicle body (FIG. 1). Accordingly, the effect of the high electric field generated around wire end 160 on ECU 140 is suppressed. Therefore, the second embodiment provides advantages similar to those of the first embodiment.

Third Embodiment

Figure 8:
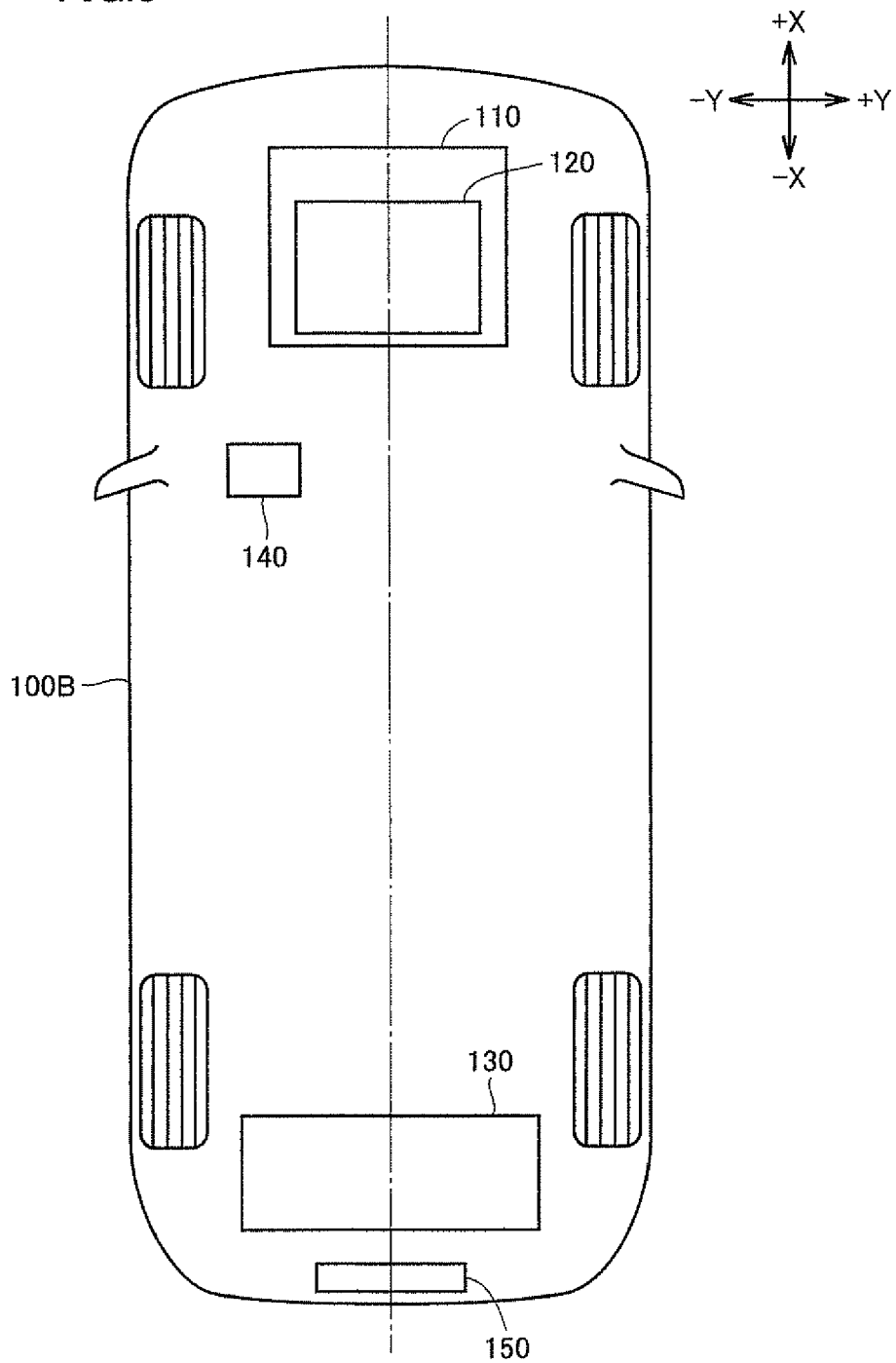
FIG. 8 represents an arrangement of the main part of an electrical powered vehicle according to a third embodiment, viewed from above the vehicle.
Figure 9:
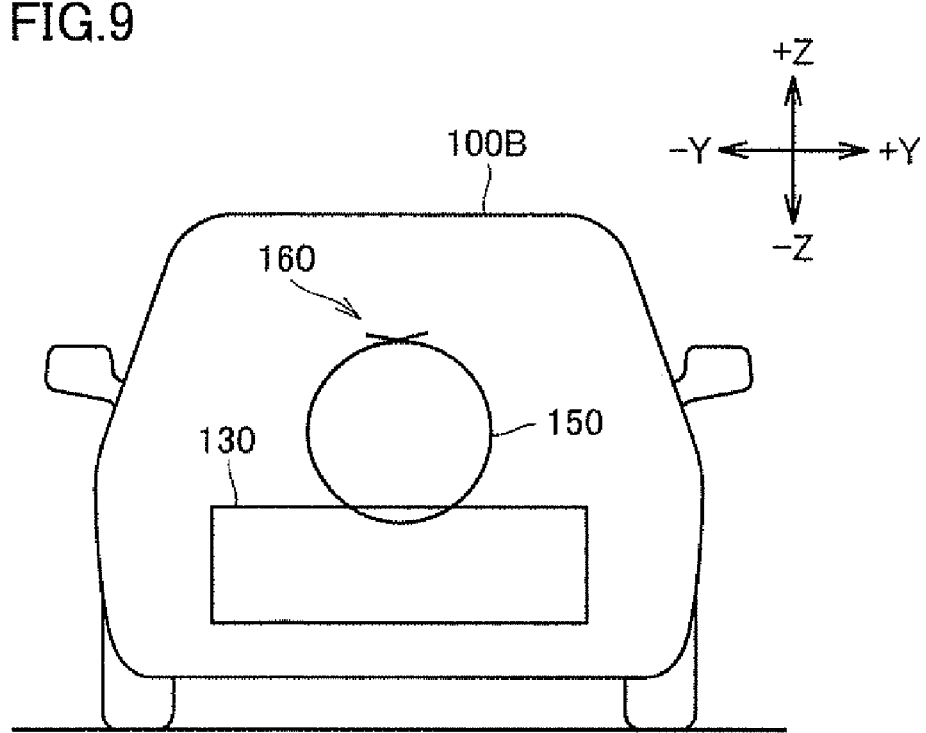
FIG. 9 represents an arrangement of the main part of the electrical powered vehicle shown in FIG. 8, viewed from the rear of the vehicle.

FIG. 8 represents an arrangement of the main part of an electrical powered vehicle according to a third embodiment, viewed from above the vehicle. FIG. 9 represents the arrangement of the main part of the electrical powered vehicle of FIG. 8, viewed from the rear of the vehicle.

Referring to FIGS. 8 and 9, an electrical powered vehicle 10013 has secondary self-resonant coil 150 installed at the rearmost region of the vehicle body (the −X direction in FIG. 8). Although power storage device 130 is arranged in proximity to the bottom face of the vehicle body, secondary self-resonant coil 150 is arranged such that wire end 160 is located at the upper portion side of the vehicle body (the +Z direction in FIG. 9).

The arrangement of the remaining electric apparatuses, i.e. transaxle 110, PCU 120, power storage device 130 and ECU 140, is identical to that of electrical powered vehicle 100 of the first embodiment. Furthermore, although not particularly illustrated, power feeding apparatus 200 of the third embodiment is provided at the rear region (−X direction) of the vehicle.

In order to keep wire end 160 distant from power storage device 130 that is the electric apparatus located closest to secondary self-resonant coil 150, secondary self-resonant coil 150 is arranged such that wire end 160 is located at the upper portion side of the vehicle body with respect to power storage device 130 arranged in proximity to the bottom face of the vehicle body. Accordingly, the effect of the high electric field generated around wire end 160 on power storage device 130 is suppressed. According to the third embodiment, the adverse effect of the high electric field generated in a power reception mode on a vehicle-mounted electric apparatus (power storage device 130) can be suppressed at low cost. Furthermore, according to the third embodiment, the adverse effect of the high electric field generated in a power reception mode onto a vehicle-mounted electric apparatus (power storage device 130) can be suppressed without reducing the feeding electric power.

Figure 10:
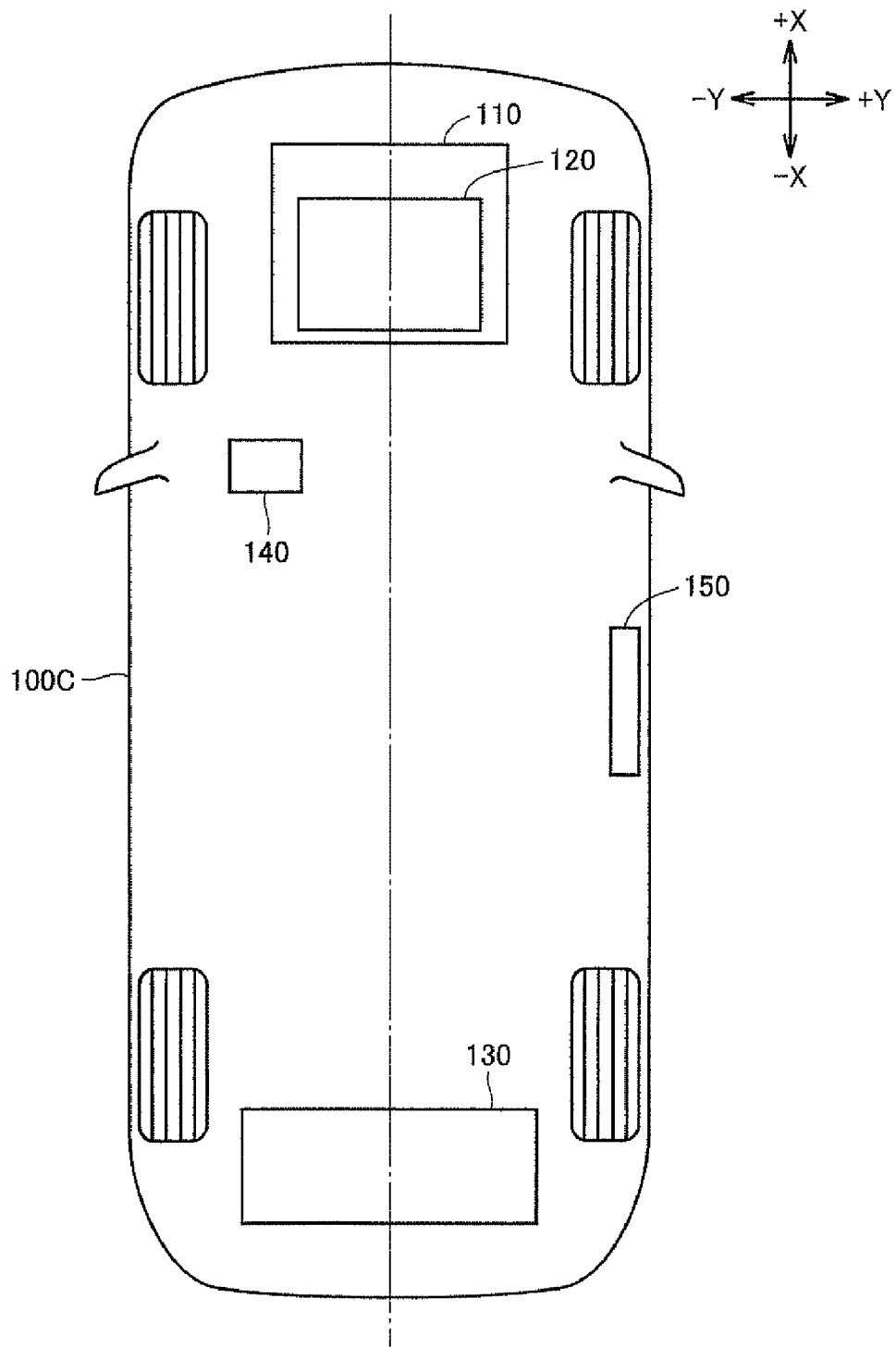
FIG. 10 represents an arrangement of the main part of an electrical powered vehicle according to another embodiment, viewed from above the vehicle.

As another embodiment, shown in FIG. 10, secondary self-resonant coil 150 may be arranged at a side face of the vehicle body (the +Y direction in FIG. 10) opposite to the side where ECU 140 is arranged, relative to the bilateral symmetric axis of the vehicle body. In this case, secondary self-resonant coil 150 is preferably installed such that the wire end thereof is located at the upper direction region or lower direction region of the vehicle body in view of the effect of the high electric field generated around the wire end of secondary self-resonant coil 150 onto transaxle 110, PCU 120 and power storage device 130.

Figure 11:
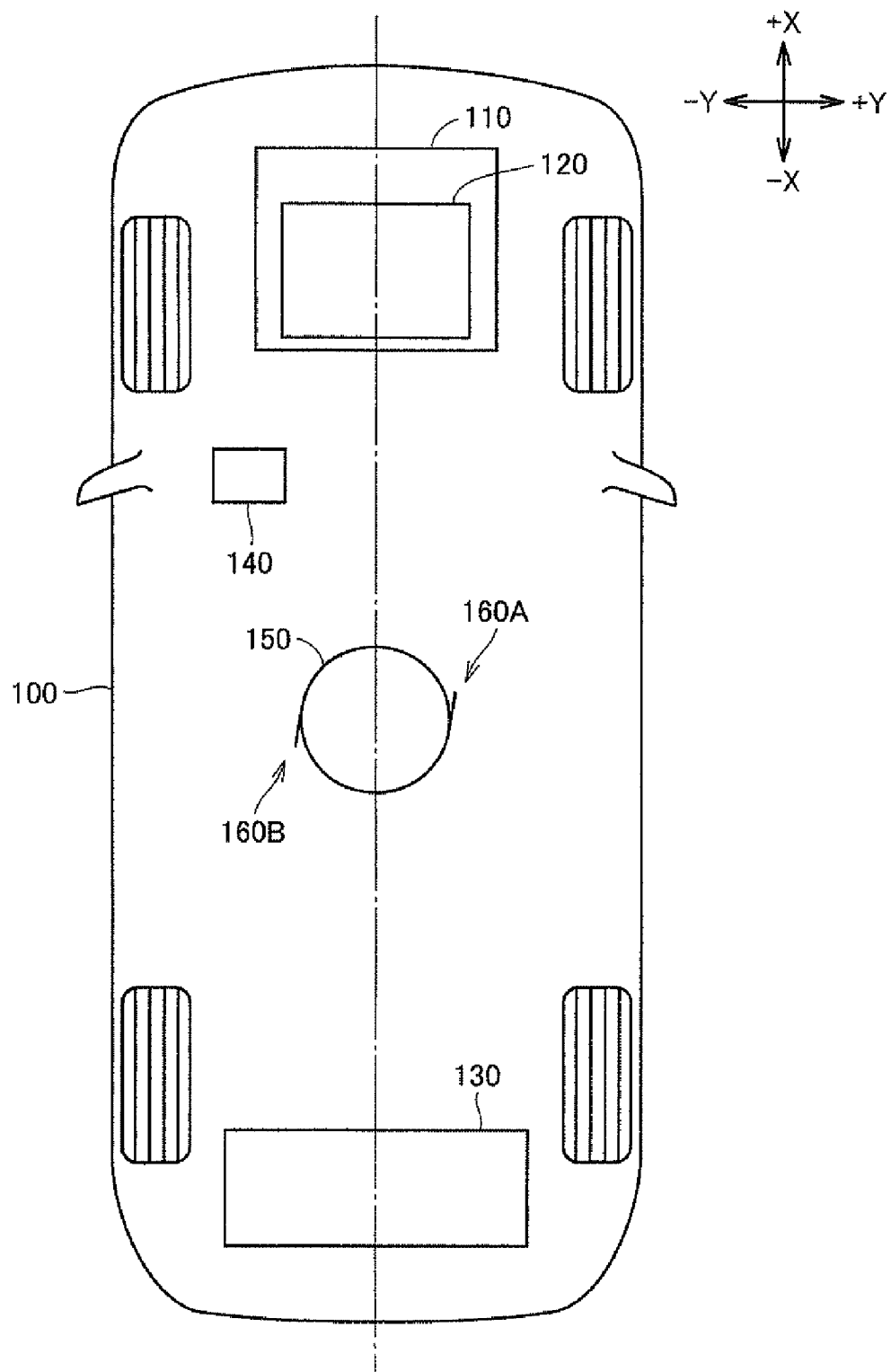
FIG. 11 represents an arrangement of the main part of an electrical powered vehicle, viewed from above the vehicle.

Although the two wire ends 160 of secondary self-resonant coil 150 are in close proximity to each other in the first and second embodiments, shown in FIG. 11 secondary self-resonant coil 150 should be installed such that wire ends 160A and 160B thereof, when located in a direction opposite to each other, are positioned in the +Y direction and −Y direction, respectively. By such an arrangement, the effect of the high electric fields generated around wire ends 160A and 160B on ECU 140 can be suppressed.

As another embodiment, a capacitor for adjusting the resonant frequency of secondary self-resonant coil 150 may be connected between both ends of secondary self-resonant coil 150.

Figure 12:
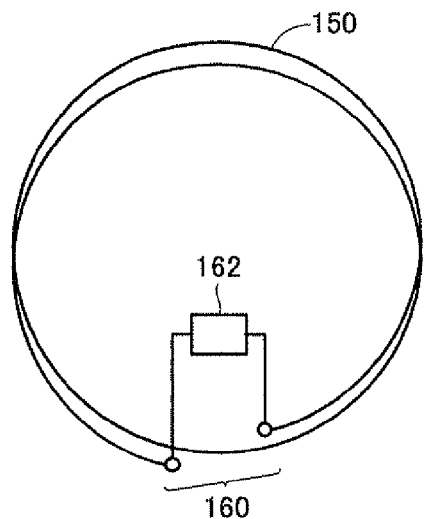
FIG. 12 represents a configuration in which a capacitor is connected between both ends of a secondary self-resonant coil.
Figure 13:
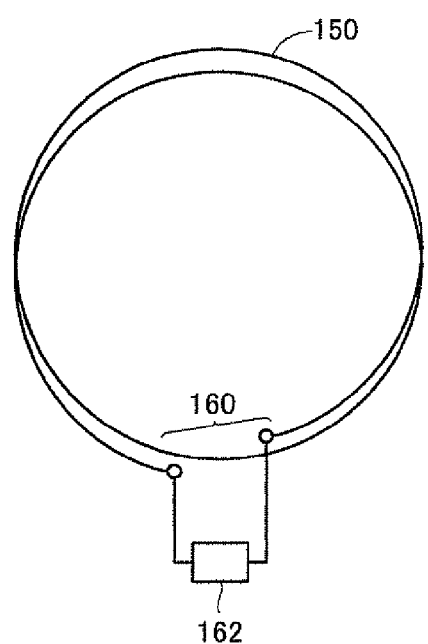
FIG. 13 represents another configuration in which a capacitor is connected between both ends of a secondary self-resonant coil.

FIG. 12 represents a configuration in which a capacitor is connected between both ends of secondary self-resonant coil 150. Referring to FIG. 12, capacitor 162 serves to adjust the resonant frequency of secondary self-resonant coil 150, and is constituted by, for example, a variable capacitor capable of modifying the capacitance. Capacitor 162 is connected to wire end 160 of secondary self-resonant coil 150, and arranged inside secondary self-resonant coil 150. By adjusting the capacitance of capacitor 162, the resonant frequency of secondary self-resonant coil 150 can be adjusted to the transmission frequency (the frequency of the high frequency electric power output from high frequency power driver 210). Capacitor 162 may be arranged outside secondary self-resonant coil 150, as shown in FIG. 13.

The arrangements of each electric apparatus (transaxle 110, PCU 120, power storage device 130 and ECU 140) and secondary self-resonant coil 150 in the embodiments set forth above are by way of example, and the application range of the present invention is not limited to an electrical powered vehicle having the arrangement set forth above. For example, the present invention is applicable to a vehicle having transaxle 110 and/or PCU 120 arranged at the rear region of the vehicle body, or a vehicle having ECU 140 arranged in the +Y direction relative to the bilateral symmetric axis of the vehicle body.

Although a series/parallel type hybrid vehicle in which the driving power of engine 172 is split by power split device 174 to be transmitted to driving wheel 176 and motor generator 112 has been taken as an example of an electrical powered vehicle in the above description, the present invention is also applicable to other types of hybrid vehicle. For example, the present invention is applicable to the so-called series type hybrid vehicle using engine 172 only for driving motor generator 112 and the driving power of the vehicle is generated by motor generator 114 alone, to a hybrid vehicle having only the regenerative energy among the kinetic energy generated by engine 172 collected as electric energy, to a motor assist type hybrid vehicle using the engine as the main driving source, and assisted by the motor as necessary, and the like.

Further, the present invention is applicable to an electric vehicle that runs only by electric power, lacking an engine 172, or to a fuel cell vehicle further including a fuel battery in addition to power storage device 130 as the DC power source. Moreover, the present invention is applicable to an electrical powered vehicle lacking a boost converter 122, or lacking DC/DC converter 186.

In the foregoing, motor generators 112 and 114 constituting transaxle 110, PCU 120, power storage device 130 and ECU 140 set forth above correspond to the "electric apparatus" of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electric power reception apparatus comprising:
    a secondary self-resonant coil receiving electric power from a primary self-resonant coil directed to power transmission in a non-contact manner by resonating, via an electromagnetic field, with said primary self-resonant coil, and
    at least one electric apparatus among a power storage device capable of storing electric power received by said secondary self-resonant coil, an electric motor generating a driving force, a driving device driving said electric motor using the electric power received by said secondary self-resonant coil, and an electronic control unit controlling said driving device,
    said secondary self-resonant coil being arranged such that both terminal wire ends of said secondary self-resonant coil are located distant from an electric apparatus closest to said secondary self-resonant coil among said electric apparatus.

2. The electric power reception apparatus according to claim 1, wherein the electric apparatus closest to said secondary self-resonant coil among said electric apparatus is said electronic control unit.

3. The electric power reception apparatus according to claim 1, further comprising a capacitor connected between both ends of said secondary self-resonant coil.

4. An electrical powered vehicle comprising:
    a secondary self-resonant coil receiving electric power from a primary self-resonant coil directed to power transmission in a non-contact manner by resonating, via an electromagnetic field, with said primary self-resonant coil, and
    at least one electric apparatus among a power storage device capable of storing electric power received by said secondary self-resonant coil, an electric motor generating a driving force of the vehicle, a driving device driving said electric motor using the electric power received by said secondary self-resonant coil, and an electronic control unit controlling said driving device,
    when the electric apparatus closest to said secondary self-resonant coil among said electric apparatus is located at one side of a bilateral symmetric axis in a longitudinal direction of said vehicle, said secondary self-resonant coil being arranged such that both terminal wire ends of said secondary self-resonant coil are located at the other side of said bilateral symmetric axis.

5. The electrical powered vehicle according to claim 4, wherein
    said electric motor and said driving device are arranged at a front region of a vehicle body,
    said power storage device is arranged at a rear region of the vehicle body,
    said electronic control unit is arranged between said electric motor as well as said driving device and said power storage device in a longitudinal direction of the vehicle body, and,
    said secondary self-resonant coil is arranged at substantially a central region at a bottom face of the vehicle body.

6. The electrical powered vehicle according to claim 4, wherein
    said electric motor and said driving device are arranged at a front region of a vehicle body,
    said power storage device is arranged at a rear region of the vehicle body,
    said electronic control unit is arranged between said electric motor as well as said driving device and said power storage device in a longitudinal direction of the vehicle body, and,
    said secondary self-resonant coil is arranged at substantially a central region at an upper portion of the vehicle body.

7. The electrical powered vehicle according to claim 4, wherein the electric apparatus closest to said secondary self-resonant coil among said electric apparatus is said electronic control unit.

8. The electrical powered vehicle according to claim 4, further comprising a capacitor connected between both ends of said secondary self-resonant coil.

* * * * *